J. PEPLER.
STONE SAWING MACHINE.

No. 180,916. Patented Aug. 8, 1876.

WITNESSES:
Chas. Niota
John Goethals

INVENTOR:
J. Pepler
BY
ATTORNEYS.

UNITED STATES PATENT OFFICE.

JAMES PEPLER, OF GREEN POINT, NEW YORK.

IMPROVEMENT IN STONE-SAWING MACHINES.

Specification forming part of Letters Patent No. 180,916, dated August 8, 1876; application filed July 1, 1876.

*To all whom it may concern:*

Figures 1, 2:
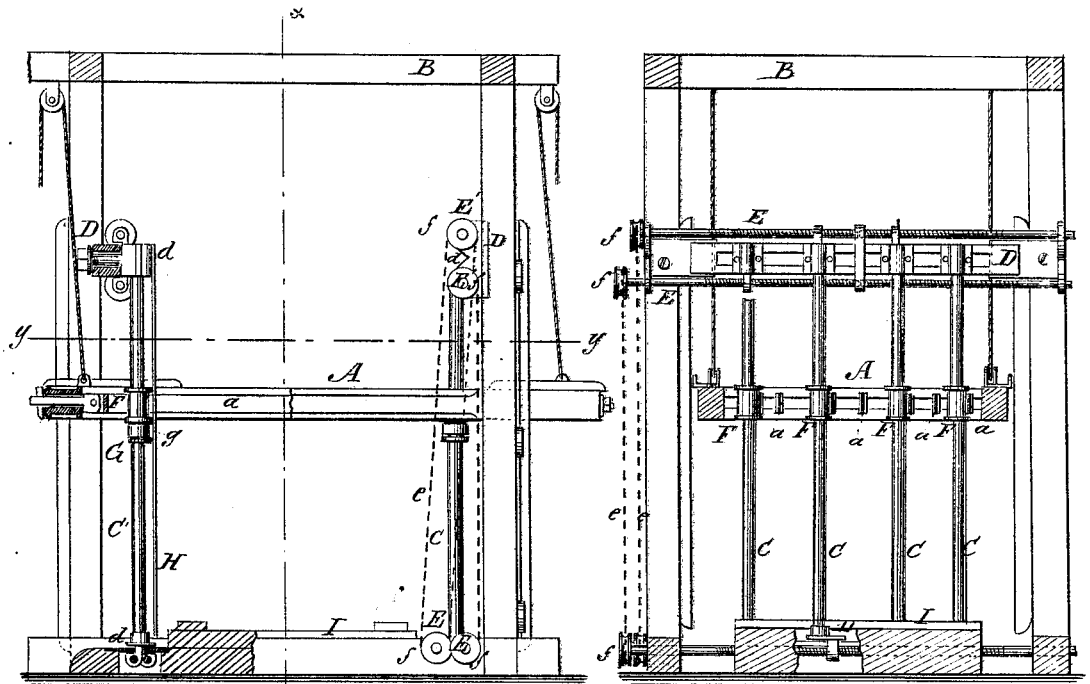
Figure 3:
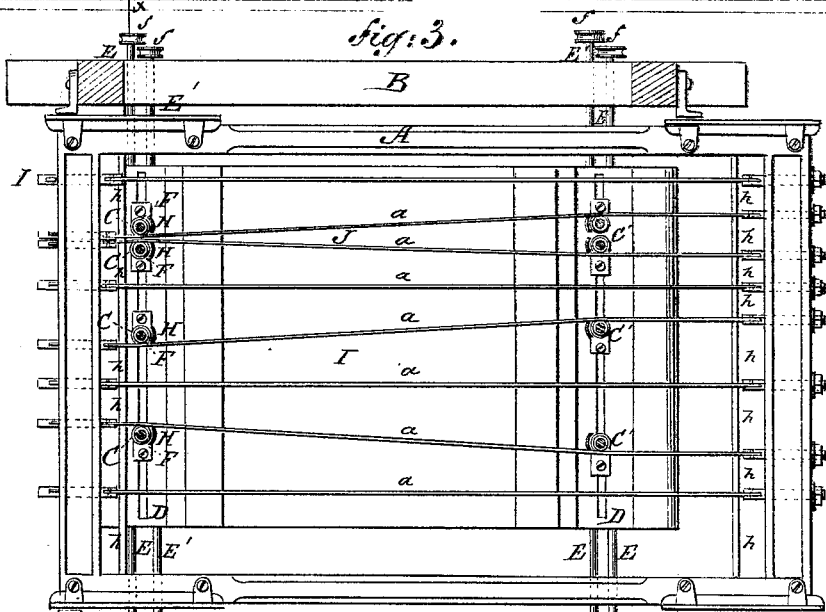

Be it known that I, JAMES PEPLER, of Green Point, in the county of Kings and State of New York, have invented a new and Improved Stone-Sawing Machine, of which the following is a specification:

Figure 1 is a side elevation, in part in section. Fig. 2 is a vertical section on line $x\ x$ in Fig. 1. Fig. 3 is a transverse section on line $y\ y$ in Fig. 1.

My invention relates to machines for sawing stone; and it consists in the arrangement of roller-guides for the saws, which make it possible to make diagonal or straight cuts through a block, or to make both diagonal or straight cuts at one time in a block of stone.

The object of my invention is to save the time and stock that have heretofore been lost by sawing stone in the ordinary manner.

A is the saw-frame, which is supported and guided, in the ordinary manner, in the frame B. The saws $a$ are retained in the frame A, in the ordinary way, by key and nut. C C', &c., are vertical shafts, having adjustable supports $d$ at each end, which slide in ways D D', and each vertical shaft is provided with a pair of screws, E E', which are connected and made to move simultaneously by the chains $e$ working on sheaves $f$ at the end of the screws. F F are flanged rollers placed on the shafts C, and bearing against the saws, to deflect them and cause them to run diagonally, at a greater or less angle, according to the requirements of the work in hand. The faces of the saws are held truly vertical, and the distance between them is fixed by the stays $h$. H is a shield placed in front of the shaft C and roller F, to prevent the sand and water from getting on the shaft.

The operation of my improved machine may be described as follows: The block of marble or other stone to be sawed is placed on the support I, and if it is to be worked up into monument-shafts, the saws are arranged as shown in Fig. 3, the rollers guiding and deflecting them so that they will saw diagonally through the block. On turning the blocks over, the saws are arranged as shown at J, two being placed in one socket or holder at one end, to bring them as near together as possible, to cut out the "wedge" between the shafts. The saws may be arranged so that part only will saw diagonally, or all may be adjusted to saw in that way.

Where my improvement is used, the stock is cut up to better advantage than it can be by the ordinary method. The saving in time, both in sawing and handling the stone, is considerable.

Having thus described my invention, what I claim as new, and desire to secure by Letters Patent, is—

1. The combination of the screws E, chains $e$, supports $d$, ways D, shafts C, and rollers F, substantially as shown and described.

2. The combination, in a stone-sawing machine, of the shield H, roller F, and shaft C, as set forth.

JAMES PEPLER.

Witnesses:
T. B. MOSHER,
ALEX. F. ROBERTS.